UNITED STATES PATENT OFFICE.

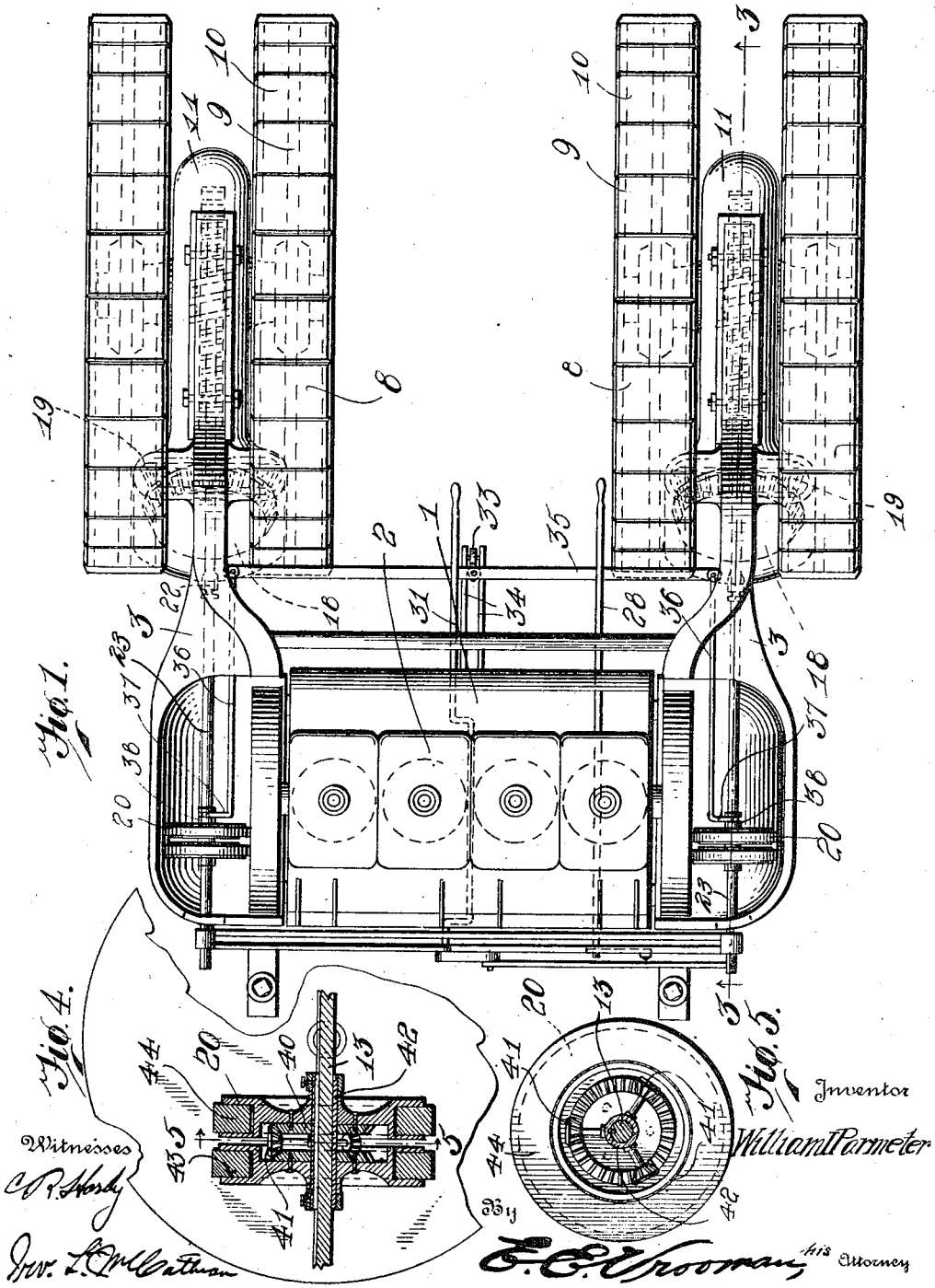

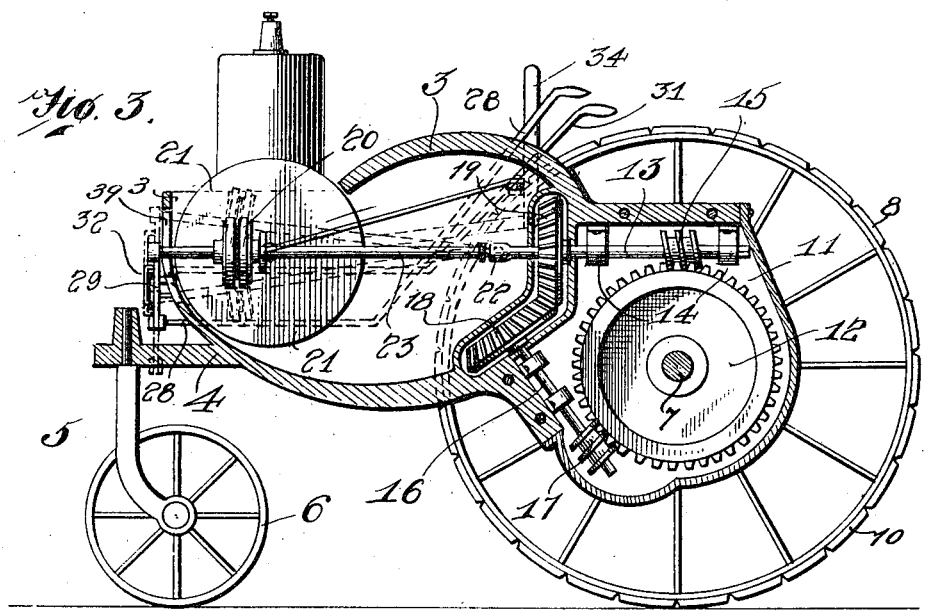
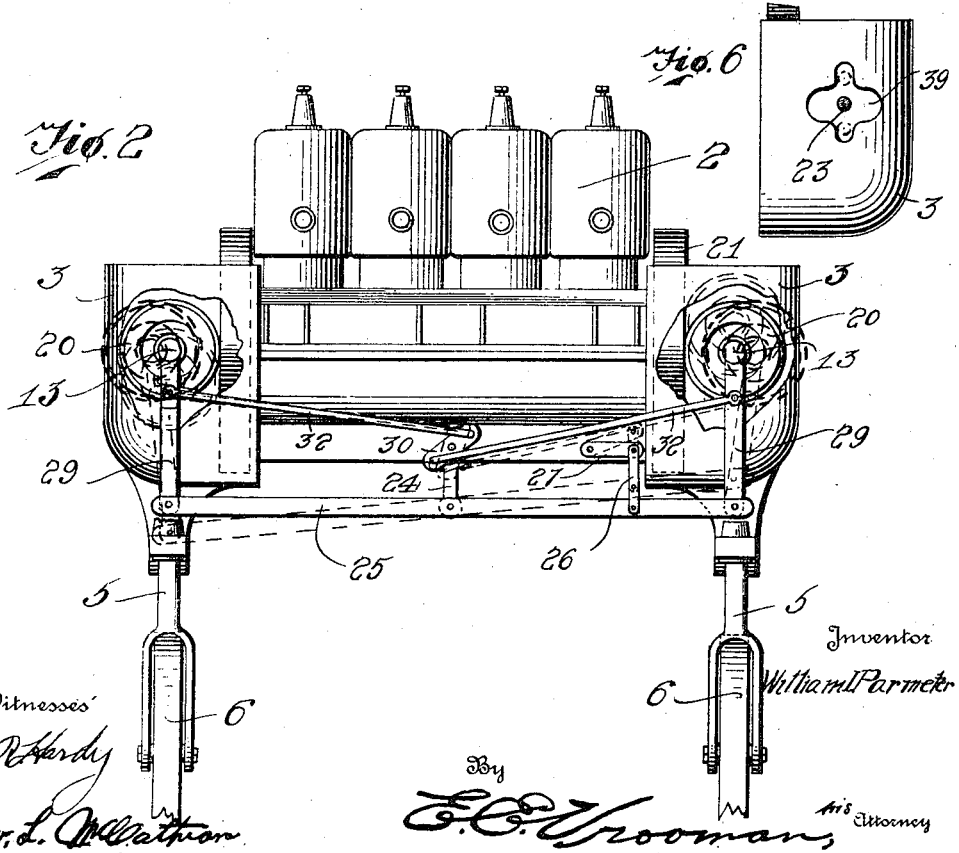

WILLIAM ISAAC PARMETER, OF WELLSTON, OKLAHOMA.

PROPELLING DEVICE.

1,184,121. Specification of Letters Patent. Patented May 23, 1916.

Application filed October 13, 1914. Serial No. 866,541.

*To all whom it may concern:*

Be it known that I, WILLIAM I. PARMETER, a citizen of the United States of America, residing at Wellston, in the county of Lincoln and State of Oklahoma, have invented certain new and useful Improvements in Propelling Devices, of which the following is a specification, reference being had therein to the accompanying drawing.

This invention relates to propelling devices of the traction engine type and comprises an efficient means for facilitating the propelling of a vehicle and also steering the same through the propelling mechanism.

Another object of this invention is the production of a simple and efficient driving mechanism for a vehicle for transmitting power from the engine to the driving wheels.

With these and other objects in view this invention consists of certain novel combinations, constructions, and arrangements of parts as will be hereinafter fully described and claimed.

In the accompanying drawings:—Figure 1 is a top plan view of the device. Fig. 2 is a front view thereof. Fig. 3 is a section taken on line 3—3, of Fig. 1. Fig. 4 is a plan view of a portion of the friction drive showing the friction disk mounted thereon. Fig. 5 is a section taken on line 5—5, of Fig. 4. Fig. 6 is a front elevation of one of the side frames of the traction engine.

By referring to the drawings it will be seen that 1 designates the main frame which supports the engine 2, and this main frame is provided with a pair of side frames 3. The frame 1 carries a plurality of projecting portions 4 in which projecting portions are journaled the forward caster wheel supporting members 5, which supporting members 5 carry the caster wheels 6.

The rear driving axle 7 is carried between the side frames 3 and passes through the rear end of these frames, and upon this driving axle 7 are mounted the driving wheels 8. These driving wheels 8 comprise a plurality of spaced bands 9 which are connected along their periphery by means of the cleats 10, as is clearly illustrated in Fig. 1. Each of the side frames 3 is provided with a gear housing 11 in which is mounted a worm wheel 12, which worm wheel 12 is carried by the axle 7. A primary driving shaft 13 is carried within the forward end of the frame 3 and is supported upon a plurality of hangers 14. A worm screw 15 is carried by the shaft 13 and meshes with the worm wheel 12 as is illustrated in Fig. 3. An auxiliary drive shaft 16 is also carried within the gear casing 11 of the frame 3, and this auxiliary driving shaft carries a worm screw 17, which worm screw meshes with the worm wheel 12. A beveled gear 18 is carried by the shaft 16 and a beveled gear 19 is carried by the shaft 13, said shafts meshing as clearly illustrated in Fig. 3 for the purpose of facilitating the driving of the main shaft 13. This main shaft 13 carries a friction wheel 20 which is slidably mounted upon the shaft and keyed thereto so as to cause the friction wheel to rotate with the shaft 23. The friction wheel 20 normally engages the friction wheel 21 carried by the engine 2 to impart rotary movement to the main drive shaft 13. It should be understood that a similar driving mechanism is placed upon each side of the main frame 1 and that a pair of driving wheels 8 are mounted upon opposite sides of the engine as clearly illustrated in Fig. 1. It should be understood that the friction wheel 20 may be thrown into engagement with the friction disk 21 when so desired so as to control the driving of the drive wheels 8.

By carefully considering Fig. 3 it will be seen that the shaft 13 is provided with a universal joint connection 22 so as to facilitate the free movement of the forward portion 23 of the shaft 13 as will be more clearly hereinafter described.

A hanger 24 is suspended from the forward end of the frame 3 and a link 25 is pivotally mounted upon the hanger 24 as is illustrated in Fig. 2. A link connection 26 is connected to the link 25 and is also connected to a crank arm 27, said crank arm being connected to an operating shaft 28 clearly illustrated in Figs. 1 and 3. Supporting links 29 are pivotally connected to the respective ends of the link 25 as is clearly illustrated in Fig. 2 so as to allow the supporting links 29 to be raised or lowered when it is desired to turn the machine as will be more clearly hereinafter described.

A shifting crank 30 is carried by a shifting lever 31 and this shifting crank engages the shifting links 32, which shifting links engage the supporting links 29, and it will be seen that when the shifting lever 31 is swung, the crank 30 will also be swung, thereby causing the links 32 to be moved outwardly and swing the friction disks 20 out of engagement with the friction wheels 21. Upon a reverse movement of the shifting lever 31, the friction disks 20 may be brought into firm engagement with the friction wheel 21. A reversing lever 33 is pivotally supported upon a plurality of supporting brackets 34, and this lever 33 carries a transversely extending link 35, which link engages at its respective ends the shifting arms 36, which shifting arms 36 are provided with laterally extending forks 37 for the purpose of engaging the sleeves 38 of the friction disks 20 as is clearly illustrated in Fig. 1. The link 35 is pivotally connected to the reversing lever 33 so as to allow the free sliding movement of the disks 20 relative to each other, but it should be understood that the disks 20 may be drawn inwardly toward the lever 33 and beyond the center of the driving disk 21 for the purpose of causing a reverse driving movement upon the shaft 23. It should be understood that the disks 20 are keyed to the forward portion 23 of the shaft so as to allow free sliding movement of the disks 20 upon the shaft and cause the disks to rotate therewith.

The operation of the device is as follows: The driving movement will be imparted to the driving wheels 8 through the medium of the driving gears coöperating with the shaft 13, and this driving movement will be imparted to the shaft 13 through the means of the friction disks 20 contacting with the friction driving wheels 21. Should it be desired to turn the device or machine to travel at an angle to the previous line of travel, it should be understood that the steering lever 28 may be swung so as to swing the crank 27 and raise or lower one of the forward portions 23 of one of the shafts 13. Provided the disk 20 upon the right-hand side of the machine is raised it will be seen that the disk 20 will slide downwardly upon the forward portion 23 of the shaft 13, whereas the disk 20 upon the left-hand side of the machine will move outwardly at the outer end thereof, causing the drive wheels upon one side of the machine to travel at a slower speed than the drive wheels upon the opposite side of the machine and cause the machine to travel in the desired direction. It of course should be understood that by means of a reverse movement of the shaft 28 the machine may be steered in the opposite direction.

From the foregoing description it will be seen that the steering of the device is caused entirely by the different speed of travel of the driving wheels, and that the driving wheels are rigidly secured to the frame and do not swing relative to the frame.

Should it be desirous of reversing the device, the reversing lever 33 may be drawn rearwardly thereby pulling the disks 20 toward the rear of the machine and beyond the center of the driving wheels 21.

Should it be desired to entirely disengage the disks 20 from the wheels 21 the lever 31 may be swung so as to cause the crank 30 to assume the position shown in dotted lines in Fig. 2 and force the disks 20 out of engagement with the wheels 21 to the position shown in dotted lines in Fig. 2. The forward portions 23 of the shafts 13 may have this free movement owing to the fact that the forward portions 23 of the shafts 13 work in the apertures 39 formed in the forward portion of the frame 3.

For the purpose of adding additional friction to the disks 20 a pair of these disks are employed wherein each disk is provided with a gear 40 upon its inner face, which gears are interlocked by means of the beveled pinions 41 carried by the sleeve 42 mounted upon the shaft 13. Grooves 43 are formed upon the outer edge or periphery of the friction disks 20 and tapering friction rings 44 are placed in the groove 43 for the purpose of constituting an efficient friction surface in order to frictionally drive the friction disks 20. By means of the disks being formed in the manner just described it will be seen that additional driving surface has been produced, and that by the connection of the two friction wheels as above described and as specifically illustrated in Fig. 4, one wheel may travel slightly faster than the other, thereby greatly increasing the driving power of the device.

Having thus described the invention, what is claimed as new, is:—

1. A device of the class described comprising a frame, driving wheels supporting the same, friction drive wheels, means for driving said friction drive wheels, a driving shaft coöperating with each driving wheel, the forward end of said driving shafts being capable of having a universal movement, friction driving disks slidably mounted upon said shafts, and means for raising and lowering the outer ends of said shafts for causing said friction drive disks to slide upon said shafts.

2. A device of the class described comprising a frame, driving wheels supporting the same, friction drive wheels, means for driving said friction drive wheels, a driving shaft coöperating with each driving wheel, the forward end of said driving shafts being capable of having a universal movement, friction driving disks slidably mounted upon said shafts, means for raising and lowering the outer end of said shafts for causing said friction drive disks to slide upon said shafts, and means for raising the shaft upon one side of said machine and lowering the shaft upon the opposite side of the machine for causing the disks upon one side of the machine to move outwardly and causing the disks upon the opposite side of the machine to move inwardly, whereby said driving wheels will travel at different speed for controlling the steering of said machine.

3. A device of the class described comprising a frame, driving wheels carried thereby, supporting wheels carried by said frame, a driving mechanism carried by said frame, driving disks, a driving shaft cooperating with each driving wheel, said driving shaft provided with universally mounted forward ends, means for throwing said disks into and out of engagement with said driving wheels, means for manually moving said disks longitudinally of said shafts for causing a reverse movement of said shafts, and means for tilting said shafts for causing said disks to automatically move longitudinally of said shafts.

4. A device of the class described comprising a frame, driving wheels carried thereby, supporting wheels carried by said frame, a driving mechanism carried by said frame, driving disks, a driving shaft cooperating with each driving wheel, said driving shaft provided with universally mounted forward ends, means for throwing said disks into and out of engagement with said driving wheels, means for manually moving said disks longitudinally of said shafts for causing a reverse movement of said shafts, means for tilting said shafts for causing said disks to automatically move longitudinally of said shafts, said friction disks comprising a plurality of interlocking wheels provided with gears upon their adjacent faces, and pinions connecting the adjacent gears of said friction disks for facilitating the driving of said shafts.

In testimony whereof I hereunto affix my signature in presence of two witnesses.

WILLIAM ISAAC PARMETER.

Witnesses:
J. H. KENNY,
D. R. THOMPSON.